Oct. 15, 1929.  F. C. BOECK ET AL  1,732,189
PUMP PISTON
Filed Jan. 28, 1929   2 Sheets-Sheet 1

Inventor
F. C. Boeck.
O. C. Kuehne.
By Lacey & Lacey, Attorneys

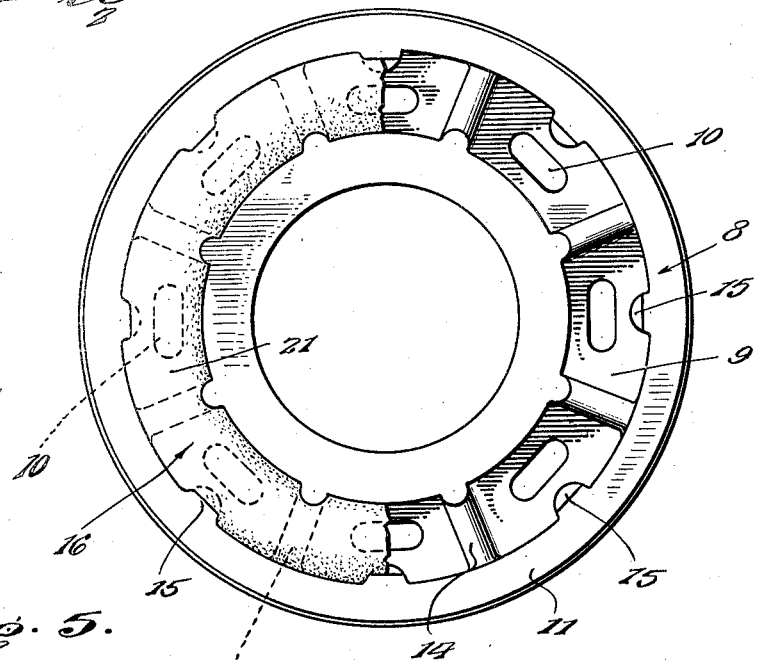
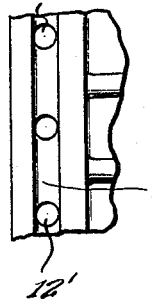
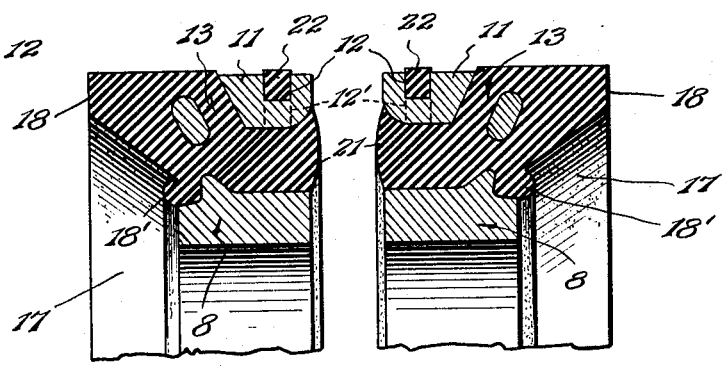

Patented Oct. 15, 1929

1,732,189

UNITED STATES PATENT OFFICE

FRED C. BOECK AND OSCAR C. KUEHNE, OF SAN ANTONIO, TEXAS

PUMP PISTON

Application filed January 28, 1929. Serial No. 335,689.

The present invention is directed to improvements in pump pistons.

The primary object of the invention is to provide a piston so constructed that a tight seal will be furnished between the piston packing and the cylinder wall.

Another object of the invention is to provide a piston so constructed that the pressure of the fluid against the packing will insure a tight seal with the cylinder wall.

Another object of the invention is to provide a device of this character so constructed that the packing will be firmly, but yieldably connected with the piston in order that the danger of the packing tearing during working of the piston will be eliminated.

Another object of the invention is to provide a piston packing so constructed that it can be adapted to piston rods of various makes.

Another object of the invention is to provide a device of this character wherein a pair of packing members are placed upon a piston rod engaging head, and when clamped together for assembly will expand the packing to insure a tight fit within the cylinder.

With these and other objects in view, this invention resides in the novel features of construction, formation, combination and arrangement of parts to be hereinafter more fully described, claimed and illustrated in the accompanying drawings, in which:—

Figure 3 is a similar view of a reverse side of the ring.

Figure 4 is a detail sectional view showing the ring in position before complete assemblage.

Figure 5 is a fragmentary side view of one of the rings.

Figure 1:
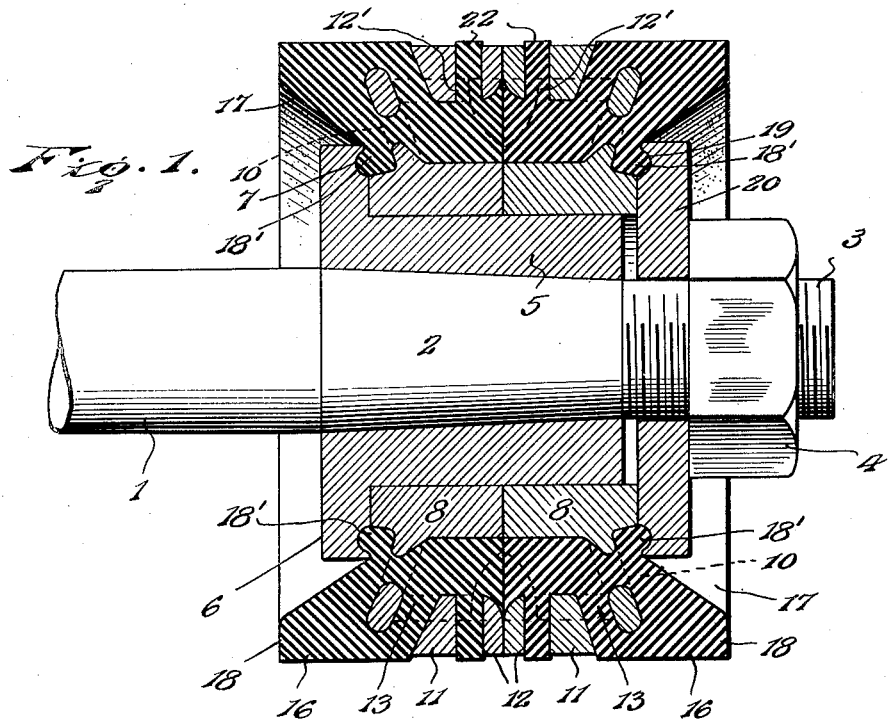
Figure 1 is a longitudinal sectional view through the device.
Figure 2:
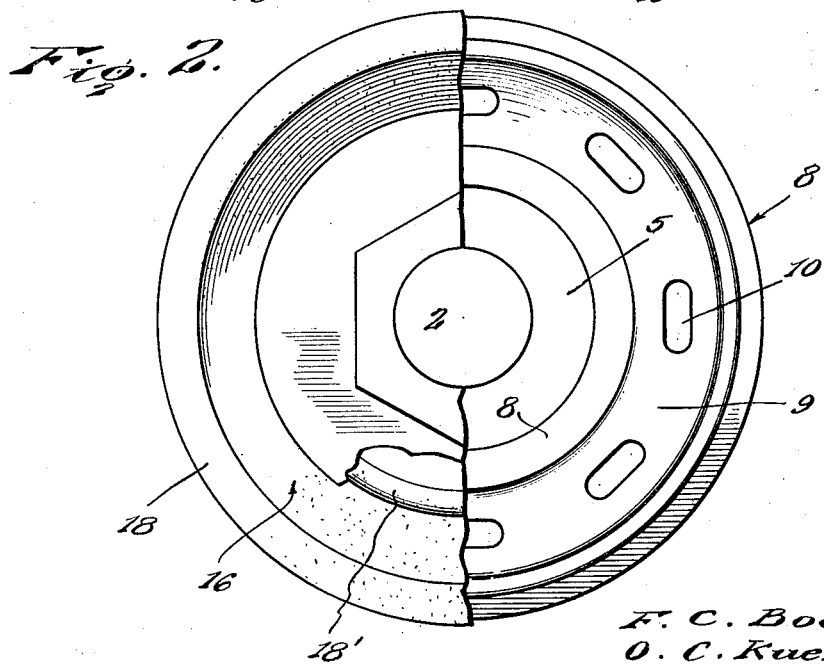
Figure 2 is a plan view of one of the rings, partly covered with the elastic packing.

Referring to the drawings, 1 designates the piston rod having a tapered portion 2 and a threaded extension 3 for engagement with the clamping nut 4. A head 5 is fitted on the portion 2 and has one end provided with an annular flange 6, said flange having formed therein an annular seat 7, the purpose of which will appear later.

In order to secure the packing to the head 5 a pair of cast metal rings 8 are employed, and since these rings are identical in construction, the description of one will suffice for both.

Formed integral with the ring is a flared flange 9 having formed therein at intervals openings 10. The periphery of the flange carries an angularly disposed rim 11 having an annular groove 12 formed in its periphery, and is further provided with openings 13. Connecting the rim 11 and ring 8 are spaced ribs 14, said rim having transverse lugs 15 formed upon its inner periphery and disposed between the ribs 14 to cooperate with said ribs and rim to define openings 13. The groove 12 is provided with base openings 12'.

The rings and component parts are placed in a suitable mold and raw rubber placed therein, after which heat and pressure is applied in order that the rubber will be cooked upon the rings and adjacent parts. The rubber mass will obviously enter the openings 10, 13 and 12' and grooves 12 and fill the space between the ribs 14. The mold form is such that when the ring is ready for use the rubber packing 16 will cling thereto with great tenacity so as to stand the strain to which devices of this kind are subjected.

The packing for each ring has its outer face formed with a conical recess 17 and a flat rim 18 which is disposed at right angles to the longitudinal axis of the ring. Each packing is further provided with an annular bead 18', as clearly shown in Figure 4, one of which being adapted to engage the seat 7 of the flange 6, while the other engages the annular seat 19 formed in the clamping disk 20.

It will be observed that when the device is ready for use a pair of rings 8 are engaged upon the head 5 and are held with their confronting faces in contact, the nut 4 and disk 20 obviously serving to hold the parts in assembled relationship.

Upon reference to Figure 4 it will be noted that after the rings are removed from the mold and are ready for assemblage that the packing at their confronting faces are formed with projections 21. When the rings are placed upon the head 5 and tightly clamped together these projections will be brought in contact with each other which action causes the remainder of the packing mass to expand, whereby the packing will engage the cylinder wall in a manner to prevent leakage of fluid past the piston.

Owing to the presence of the rims 18 the pressure of the fluid thereon will cause the packing to more firmly contact with the cylinder wall.

The rubber packing being cooked upon the ring retains its elasticity so that when the piston is subjected to strain when working thereof the packing will yield, but will not tear away from the rings and adjacent parts, as is now a common defect in pistons for this purpose.

The rib 14 and lugs 15 will firmly anchor the packing to each of the rings and since the rubber mass is bonded in the openings 10, 13 and 12' the likelihood of the packing breaking away from the rings will be positively prevented.

The rubber entering the grooves 12 during the molding process, will produce the packing bands 22, which being arranged between the packing 16 of the rings will prevent leakage since said bands are adapted to tightly engage the inner wall of the cylinder. These packing bands will also be subjected to the expansive action when the projections 21 are forced into contact thus maintaining the rims 11 from contact with the cylinder wall.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:—

1. A pump piston comprising a head, rings engaged upon the head and having flanges carried thereby, said flanges having angularly disposed rims formed integral therewith, said flanges and rims having openings formed therein, and an elastic packing molded upon each ring flange and rim, and bonded in the respective openings.

2. A pump piston comprising a head, a pair of rings, each ring having an elastic packing molded thereon, said packing having projections carried thereby adapted to contact each other when the rings are clamped upon the head to expand the packing of each ring.

3. A pump piston comprising a head for attachment to a piston rod, a pair of rings engaged upon the head, a packing molded upon each ring, beads carried by the packing, means carried by the head and piston rod for engaging the beads, and means for forcing said means towards each other to hold the rings and packing clamped together.

4. A pump piston comprising a head having an annular flange carried by one end, a piston rod engaged in the head, rings engaged upon the head, each ring having an elastic packing molded thereon, each packing being provided with a bead, a disk engaged upon the rod, and means for forcing the disk toward the flange to grip the beads.

5. A pump piston comprising a head, a pair of rings removably engaged upon the head, said rings including flared flanges and angularly disposed rims, said flanges and rims having openings therein, an elastic packing molded upon each flange and rim and having parts bonded in said openings, and means for clamping the rings together upon the head.

6. A pump piston comprising a head, a pair of rings mounted upon the head and including flanges and rims, said flanges and rims being provided with openings, said rims having peripheral grooves, an elastic packing molded upon the flange and rim of each ring and having parts thereof bonded in said openings, portions of said packing being engaged in said grooves, and means for clamping the rings in abutting relation upon the head.

7. A piston packing comprising a head having a pair of rings mounted thereon and including rims, each ring having an elastic packing molded thereon and capable of being expanded beyond the plane of the outer periphery of the rims when the rings are in clamped relationship.

8. A pump piston comprising a head, rings removably engaged upon the head, said rings having angularly disposed flanges carried thereby, the flanges having angularly disposed rims thereon, said flanges and rims having openings formed therein, and an elastic packing associated with the rings and bonded in the openings of the flanges and rims.

In testimony whereof we affix our signatures.

FRED C. BOECK. [L. S.]
OSCAR C. KUEHNE. [L. S.]